United States Patent
Müller et al.

(10) Patent No.: US 12,284,553 B2
(45) Date of Patent: Apr. 22, 2025

(54) DYNAMIC WIRELESS NETWORK FOR DUPLEX AUDIO

(71) Applicant: RTX A/S, Nørresundby (DK)

(72) Inventors: Ilka Müller, Nørresundby (DK); Christopher Meisner, Nørresundby (DK); Claus Krohn Vesterholt, Nørresundby (DK)

(73) Assignee: RTX A/S, Nørresundby (DK)

( * ) Notice: Subject to any disclaimer, the term of this patent is extended or adjusted under 35 U.S.C. 154(b) by 81 days.

(21) Appl. No.: 17/613,319

(22) PCT Filed: May 5, 2020

(86) PCT No.: PCT/DK2020/050131
§ 371 (c)(1),
(2) Date: Nov. 22, 2021

(87) PCT Pub. No.: WO2020/233758
PCT Pub. Date: Nov. 26, 2020

(65) Prior Publication Data
US 2022/0232421 A1    Jul. 21, 2022

(30) Foreign Application Priority Data
May 22, 2019  (DK) .......................... PA 2019 70326

(51) Int. Cl.
*H04W 28/16* (2009.01)
*H04B 7/26* (2006.01)
(Continued)

(52) U.S. Cl.
CPC .......... *H04W 28/16* (2013.01); *H04B 7/2643* (2013.01); *H04W 12/03* (2021.01);
(Continued)

(58) Field of Classification Search
CPC . H04W 28/16; H04W 12/03; H04W 56/0005; H04W 56/0015; H04W 72/0446;
(Continued)

(56) References Cited

U.S. PATENT DOCUMENTS 5,995,500 A * 11/1999 Ma ........................ H04W 84/08
                                                        455/524
7,359,950 B2    4/2008 Joon-Bo et al.
(Continued)

FOREIGN PATENT DOCUMENTS

| CN | 101551849 A | 10/2009 |
|----|-------------|---------|
| CN | 102833307 A | 12/2012 |

(Continued)

OTHER PUBLICATIONS

International Patent Application No. PCT/DK2020/050131; Int'l Search Report and the Written Opinion; dated Oct. 16, 2020; 20 pages.

(Continued)

*Primary Examiner* — Yu-Wen Chang
(74) *Attorney, Agent, or Firm* — BakerHostetler

(57) ABSTRACT

A wireless communication method and protocol for wireless RF transmission of duplex audio in a flexible and self organizing network, especially audio data packets may be communicated according to a DECT protocol. Each wireless RF device is arranged to operate as a synchronization master or a synchronization slave, and where a negotiation algorithm is used to negotiate with other wireless RF devices present within wireless range to determine roles of master and slave(s). This allow wireless RF devices to leave or join groups of wireless RF devices within wireless range of each other, and still the synchronization master role is negotiated, and only one synchronization master is selected, whereas the remaining wireless RF devices will operate as synchroniza- (Continued)

tion slaves. Each wireless RF device performs a scanning of supported RF frequencies or channels to detect other wireless RF devices within wireless range.

8 Claims, 3 Drawing Sheets

(51) Int. Cl.
  *H04W 12/03* (2021.01)
  *H04W 56/00* (2009.01)
  *H04W 72/0446* (2023.01)
  *H04W 72/0453* (2023.01)
(52) U.S. Cl.
  CPC ... *H04W 56/0005* (2013.01); *H04W 56/0015* (2013.01); *H04W 72/0446* (2013.01); *H04W 72/0453* (2013.01)
(58) Field of Classification Search
  CPC . H04W 72/0453; H04W 72/02; H04W 84/20; H04B 7/2643
  See application file for complete search history.

(56) References Cited

U.S. PATENT DOCUMENTS

| | | | |
|---|---|---|---|
| 7,942,824 B1 | 5/2011 | Kayyali et al. | |
| 9,789,273 B2 | 10/2017 | Lucci et al. | |
| 10,118,009 B2 | 11/2018 | Darkin et al. | |
| 2002/0031100 A1 | 3/2002 | Sashihara | |
| 2002/0055978 A1 | 5/2002 | Joon-Bo et al. | |
| 2002/0072329 A1 | 6/2002 | Bandeira et al. | |
| 2006/0030318 A1 | 2/2006 | Moore et al. | |
| 2006/0194611 A1* | 8/2006 | Pasternak | H04B 17/20 455/553.1 |
| 2010/0027517 A1 | 2/2010 | Bonta et al. | |
| 2011/0039554 A1 | 2/2011 | Bims | |
| 2011/0294474 A1 | 12/2011 | Barany et al. | |
| 2012/0084342 A1* | 4/2012 | Brown | H04N 21/43615 709/203 |
| 2012/0202484 A1* | 8/2012 | Dickinson | H04W 16/14 455/426.1 |
| 2013/0132500 A1 | 5/2013 | Vandwalle et al. | |
| 2013/0137422 A1* | 5/2013 | Sugitani | H04W 52/028 455/574 |
| 2013/0273948 A1 | 10/2013 | Tel-Or | |
| 2014/0335853 A1 | 11/2014 | Sartori et al. | |
| 2015/0072702 A1 | 3/2015 | Chun et al. | |
| 2015/0365168 A1* | 12/2015 | Arimura | H04W 56/0015 398/52 |
| 2017/0289959 A1* | 10/2017 | Aki | H04W 72/0453 |
| 2019/0030275 A1 | 1/2019 | Darkin et al. | |
| 2019/0232047 A1 | 8/2019 | Chu et al. | |
| 2020/0294401 A1 | 9/2020 | Kerecsen | |
| 2022/0391867 A1 | 12/2022 | Glaser | |

FOREIGN PATENT DOCUMENTS

| | | |
|---|---|---|
| CN | 108370389 A | 8/2018 |
| JP | 2016-167647 A | 9/2016 |

OTHER PUBLICATIONS

Lien et al.; "Design of P2Pnet: An Autonomous P2P Ad-Hoc Group Communication System"; Dept. of Computer Science, Nat'l Chengchi University; Conference Paper; Jun. 2009; 7 pages.

Santos et al.; "Self-configuration of an Adaptive TDMA wireless communication protocol for teams of mobile robots"; IEEE Int'l Conf. on Emerging Technologies and Factory Automation; 2008; p. 1197-1204.

Petig et al.; "Self-stabilizing TDMA Algorithms for Wireless Ad-hoc Networks without External Reference"; 13th Annual Mediterranean Ad Hoc Networking Workshop; 2014; p. 87-94.

"Titan Dect Solutions—Multicom Headsets and belt boxes"; Titan Communication Systems; no date available; 2 pages.

International Patent Application Number PCT/DK2020/050134; Int'l Search Report and the Written Opinion; dated Jul. 14, 2020; 17 pages.

Nie et al.; "A statistical frame based TDMA protocol for human body communication"; BioMed Engineering Online; vol. 14;65; 2015; 20 pages.

"Time-division multiple access"; Wikipedia; https://en.wikipedia.org.w/index/php?title=Time-division_multiple_access&oldid=894129451; May 26, 2020; accessed Dec. 6, 2020; 4 pages.

U.S. Appl. No. 17/613,345; Non-Final Office Action; dated Sep. 20, 2024; 22 pages.

* cited by examiner

DYNAMIC WIRELESS NETWORK FOR DUPLEX AUDIO

CROSS-REFERENCE TO RELATED APPLICATIONS

This application is the National Stage of International Patent Application No. PCT/DK2020/050131, filed May 5, 2020, which claims the benefit of Danish application number PA 2019 70326, filed May 22, 2019, the entireties of which foregoing applications are incorporated herein by reference in their entireties for any and all purposes.

FIELD OF THE INVENTION

The present invention relates to the field of wireless transmission, such as wireless transmission of audio, such as duplex audio. Specifically, the invention proposes a dynamic wireless network suitable for duplex audio communication, e.g. using TDMA such as DECT.

BACKGROUND OF THE INVENTION

Traditional wireless TDMA (including DECT) technologies are based for star network topologies. A central wireless master device is involved and is controlling all the communication to slave devices. In a TDMA system, the master device usually provides slot and frame timing information to all the slaves. The slaves synchronize precisely to the master timing. Duplex communications are usually arranged with uplink and downlink communication paths between the master device and each slave device. The master device may relay communication from one slave device to another slave device.

SUMMARY OF THE INVENTION

Thus, according to the above description, it is an object of the present invention to provide a wireless RF communication protocol for flexible duplex audio communication in a reliable manner.

In a first aspect, the invention provides a method for wireless RF communication of a digital audio signal in audio data packets, wherein the wireless RF communication comprises providing a plurality of wireless RF devices each being configured to operate as a synchronization master or a synchronization slave in accordance with a negotiation protocol, and each being configured to transmit and to receive audio data packets represented in frames each containing a plurality of time slots in a wireless RF signal at multiple supported RF frequencies or channels, scanning, by the plurality of wireless RF devices, all of the multiple supported RF frequencies or channels, detecting, as a result of said scanning by the plurality of wireless RF devices, other wireless RF devices present within wireless range, receiving audio data packets by a wireless RF device operating as a synchronization slave directly from another wireless RF device operating as a synchronization slave, negotiating, according to the negotiation protocol, between the plurality of wireless RF devices present within wireless range to determine which one of the plurality of wireless RF devices to operate as a synchronization master, wherein the remaining wireless RF devices present within wireless range then determine to operate as synchronization slave, negotiating, according to the negotiation protocol, between the plurality of wireless RF devices present within wireless range, in case the wireless RF device operating as synchronization master comes out of wireless range, so as to determine which one of the remaining wireless RF devices within wireless range to operate as a synchronization master, and negotiating, according to the negotiation protocol, between the plurality of wireless RF devices present within wireless range according to the negotiation protocol, in case two of the wireless RF devices operate as synchronization master, so as to determine which one of said two wireless RF devices to operate as synchronization master.

Such method provides a flexible wireless RF system, e.g. using the DECT protocol, e.g. for duplex audio communication, such as two-way speech communication. All wireless RF devices can operate as master as well as slave, and which operation is determined by a negotiation protocol ensuring a negotiation among wireless RF devices within wireless range.

The method is flexible, since it allows division of a group of wireless RF devices into sub-groups, or sub-groups may be joined to form one larger group of wireless RF devices. The master role is negotiated to ensure only one master for timing synchronization, and redundant masters will change to slave operation. Further, the method allows two slave devices to communicate directly without requiring communication relay by a master device.

Further, the method supports groups of wireless RF devices which can all receive audio data packets from one wireless RF devices. Thus, the method is advantageous for e.g. multi-user intercom systems. However, if preferred, private line (between two wireless RF devices) or conference communication (between a groupd of selected wireless RF devices) can be implemented.

The below phrases will be used and are therefore explained:

Time Division Multiple Access (TDMA).

Received Signal Strength Indicator (RSSI).

Cyclic Redundancy Check (CRC) for error check and possible correction of data.

A single radio event e.g. transmit or receive is denoted a slot or time slot.

A repeated sequence of downlink and uplink slots, including slot(s) for interference scanning (TDMA frame) is denoted a frame.

In the following preferred embodiments and features will be described.

The RF communication is preferably performed according to a Time Division Multiple Access or a Frequency Division Multiple Access frame structure. Especially, the RF communication is performed according to a Digital Enhanced Cordless Telecommunication protocol.

In some embodiments, the method provides a duplex audio communication between first and second wireless RF devices of the plurality of wireless RF devices, or between a group of three or more wireless RF devices. In a special implementation, audio data packets are transmitted from the first wireless RF device to the second wireless RF device is performed at a first supported RF frequency, and wherein audio data packets transmitted from the second wireless RF device to the first wireless RF device is performed at a second supported RF frequency being different from the first supported RF frequency.

Preferably, the method comprises determining, by all of the RF devices, an interference level on a plurality of supported RF frequencies and time slots by the plurality of RF devices, such as measuring a level of RF activity in the respective supported RF frequencies, e.g. said determining of interference level comprises measuring an RSSI level. This can be used to determine which RF frequencies or time slots to use. Alternatively, or additionally, this can be used in the negotiation between the wireless RF devices which one to operate as a master, since it is preferred that the master is the one device which provides the most stable RF communication to the remaining RF devices within wireless range.

The method may comprise determining, by each of the wireless RF devices, packet error rates for a plurality of the supported RF frequencies and time slots, and to select on which RF frequency and in which time slot to transmit audio data packets accordingly. Again, this can be used to determine which RF frequencies or time slots to use. Alternatively, or additionally, this can be used in the negotiation between the wireless RF devices which one to operate as a master.

The method may comprise that each of the plurality of wireless RF devices are arranged to transmit one audio data packet on two different supported RF frequencies or two different time slots. This helps to enhance chance of successful transmission without the need to retransmit the packet and thus enhances reliability in the audio communication.

The method may comprise that each of the plurality of wireless RF devices are arranged to select which one or more supported RF frequency and time slots to be used for transmission of an audio data packet in response to a combination of two or more of:
1) levels of RF activity at the respective supported RF frequencies or channels and time slots,
2) reported measurement data from one or more of the other wireless RF devices indicative of channel quality indicator values measured for a plurality of the supported RF frequencies and time slots,
3) a frequency distance between a currently used RF frequency or channel and time slots, and another one or more supported RF frequency or channel and time slots, and
4) packet error rates collected for a plurality of the supported RF frequencies or channels and time slots.

Alternatively, or additionally, a combination of two or more of 1)-4) just mentioned can be used in the negotiation between the wireless RF devices which one to operate as a master.

The step of scanning and transmission of audio data packets may be performed at selected time slots.

The method may comprise that at least two wireless RF devices present in wireless range are arranged to negotiate to perform transmission of audio data packets in different time slots.

The supported RF frequencies or channels may have RF bearers located within a frequency range of less than 100 MHz, such as less than 20 MHz.

The RF devices have two or more different RF antennas for the transmission of RF signals, e.g. to allow antenna diversity.

Preferably, each time slot comprises a Cyclic Redundancy Check error check field. Optionally, a seeding of the CRC is used as a hidden system identification, thus allowing discrimination between audio data packets originating from separate systems.

The method preferably comprises forming a plurality of groups each comprising a wireless RF device operating as synchronization master and one or more wireless RF devices operating as synchronization slaves.

The method preferably comprises receiving audio data packets by a wireless RF device operating as a synchronization slave directly from another wireless RF device operating as a synchronization master. Thus, it is preferred that audio data packets can be communicated between two (or more) slaves, and between master and slave(s).

Preferably, the plurality of wireless RF devices are arranged to detect frame timing of incoming signals and wherein the plurality of RF devices are arranged to align frame timing according to the detected frame timing.

The RF transmission on the first and second RF bearers preferably involves duplex transmission between the FP and the PP.

The set of supported RF frequencies or channels preferably has RF bearers located within a frequency range of less than 100 MHz, such as within 20 MHz.

To further increase communication range and transmission reliability, antenna diversity can be used, i.e. using two or more antennas on the wireless RF devices for transmitting and receiving, which adds space diversity additionally. In preferred embodiments, each time slot preferably has an antenna probe field, in which the transmitter emits power, either modulated or unmodulated. The receive performs RSSI measurement during this field on one or more of the supported receive antennas in sequential manner. In the antenna probe fields of following frames, RSSI measurements are performed on the other antennas. After N frames, RSSI measurements have been done on all supported receive antennas, and a decision can be made of which antenna that provides the strongest receive signal. This antenna will be used for reception of packet signalling and applications payload. When a packet has been received correctly on a selected antenna, the same antenna will be used for transmission in the following frames. A change of antenna for transmission may be delayed (synchronized) such that it does not interfere with the antenna decision process of the receiver in the peer.

Especially, the audio data packets may represent a digital audio signal sampled at a sampling frequency of 20 kHz or more. The digital audio signal may be an encoded digital audio signal, such as encoded according to an ADPCM algorithm or the like.

In a second aspect, the invention provides a wireless RF device comprising at least one RF transmitter and RF receiver circuit connected to at least one RF antenna, the wireless RF device being arranged to operate according to the method according to the first aspect.

It is to be understood that the required RF transmitter and RF receiver circuits, antenna and programming required to implement the method according to the first aspect will be known by the skilled person based on the present description of the inventive method.

The device may especially be one of: a wireless headset, a wireless microphone, a wireless loudspeaker, a wireless intercom system, a video system, and a Virtual Reality device.

E.g. the wireless RF device may be a wireless intercom system at least partly built into a helmet suitable for being worn by a person, such as an intercom system at least partly built into a firefighter helmet. Thus, preferably such intercom system comprises a microphone and headset to capture an audio signal and to reproduce an audio signal, respectively.

In a third aspect, the invention provides a system comprising a plurality of wireless RF devices according to the second aspect. The system can be formed by 2-100, such as 4-20, wireless RF devices—either identical devices or different devices, provided the devices operate according to the method of the first aspect. Especially, the system may be an intercom system with 2-100 wireless RF devices.

In a fourth aspect, the invention provides use of the method according to the first aspect or the wireless RF device according to the second aspect for one or more of: two-way speech communication, or one-way streaming of music or speech. Especially, the system may be a wireless intercom system.

In a fifth aspect, the invention provides a program code arranged to cause, when executed on a device with a processor, to perform the method according to the first aspect.

It is appreciated that the same advantages and embodiments described for the first aspect apply as well the further mentioned aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
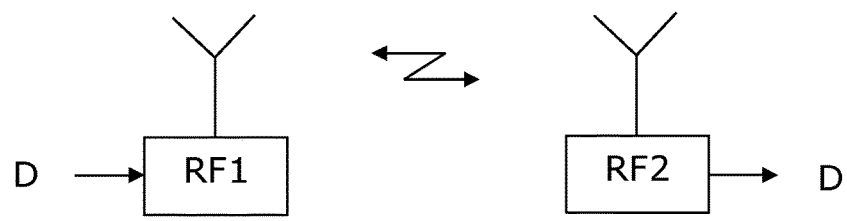
FIG. 1 illustrates a simple block diagram of two wireless RF communication e.g. DECT devices suitable for two-way audio communication.

FIG. 1 shows a simple illustration of two wireless RF devices arranged to communicate an audio signal in the form of audio data packets D which is transmitted in an RF signal in a TDMA frame structure, e.g. according to a DECT protocol, from an RF transmitter RF1 to a receiver RF2, which receives the RF signal from RF1 and thus can unpack the audio data packet D represented therein. The invention provides a negotiation protocol that allows the wireless RF devices RF1, RF2 to negotiate which one to be synchronization master and slave(s). This allows a flexible wireless RF communication scheme that allows wireless RF devices to join and leave a group of devices, and still one and only one synchronization master will be appointed. All wireless RF devices can.

The two-way intercom for speech communication, e.g. partly built into a helmet, such as a firefighter helmet.

Figure 2:
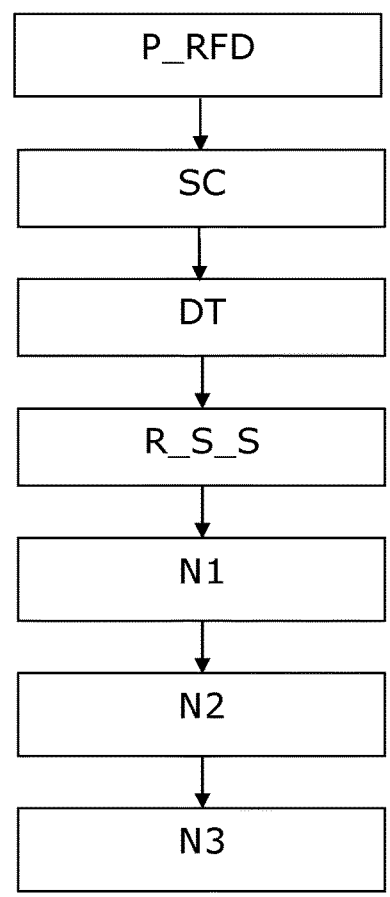
FIG. 2 illustrates steps of a method embodiment.

FIG. 2 illustrates steps of a wireless RF communication method embodiment for RF communication of a digital audio signal in audio data packets.

A plurality of wireless RF devices are provided P_RFD. Each of these are configured to operate as a synchronization master or a synchronization slave in accordance with a negotiation protocol. Further, each are configured to transmit and to receive audio data packets represented in frames each containing a plurality of time slots in a wireless RF signal at multiple supported RF frequencies or channels, preferably according to a DECT protocol. The wireless RF devices are arranged to perform scanning SC all of the multiple supported RF frequencies or channels preferably in all time slots or in selected time slots only. Further, all wireless RF devices perform detecting DT, as a result of said scanning SC, other wireless RF devices present within wireless range. The method comprises receiving R_S_S by wireless RF device operating as a synchronization slave an audio data packet directly from another wireless RF device operating as a synchronization slave. Thus, no relay by a master device is required.

The method and the negotiation protocol for negotiating between wireless RF devices within wireless range preferably comprises at least three steps:

Negotiating N1, between the plurality of wireless RF devices present within wireless range to determine which one of the plurality of wireless RF devices to operate as a synchronization master, wherein the remaining wireless RF devices present within wireless range then determine to operate as synchronization slave.

Negotiating N2 between the plurality of wireless RF devices present within wireless range, in case the wireless RF device operating as synchronization master comes out of wireless range, so as to determine which one of the remaining wireless RF devices within wireless range to operate as a synchronization master.

Negotiating N3 between the plurality of wireless RF devices present within wireless range according to the negotiation protocol, in case two of the wireless RF devices operate as synchronization master, so as to determine which one of said two wireless RF devices to operate as synchronization master.

This allows a flexible communication where wireless RF devices can join in groups and split into sub-groups and rejoin, e.g. as person wearing wireless RF devices in the form of mobile intercom systems come within and outside wireless range of each other when moving.

Figure 3:
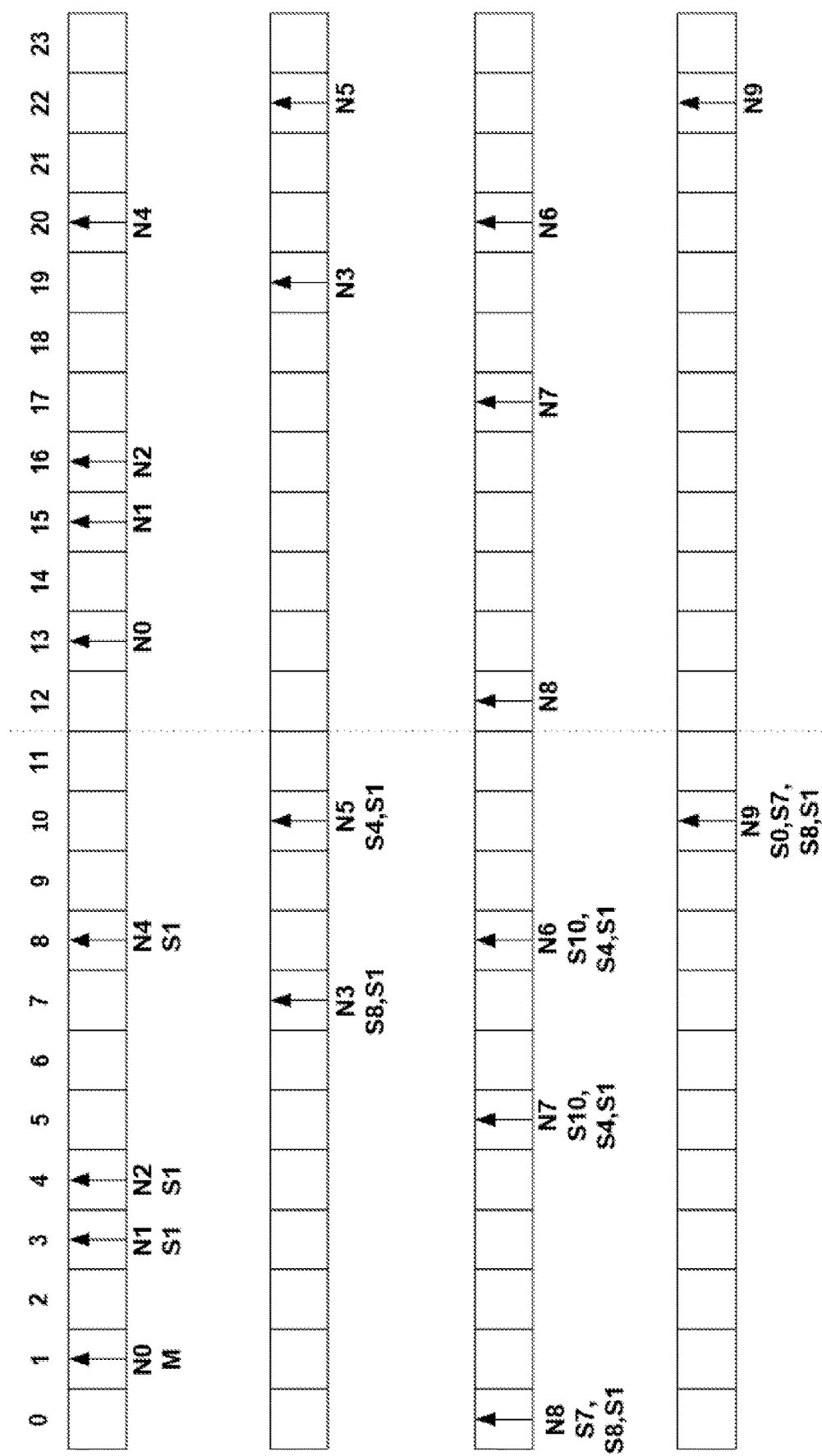
FIG. 3 illustrates an example of different synchronization levels between master and slave devices.

FIG. 3 illustrates an example of synchronization hierarchy with one master device and slave device organized in 3 synchronization levels. N0-N9 indicate node 0-9, M indicates master, and S0-S11 indicate synchronization reference slots.

Upper part shows level 1, where all slaves can synchronize to the master. Below that, level 2 is shown where slaves listen to level 1 slaves, e.g. N5 is in synchronization with N2 which is in synchronization with the master M. Below level 2, level 3 is shown, where e.g. level 2 slave N6 is not aware of N4, thus causing risk of cross talk. Finally, the lower part shows level 4, where slave N9 is in synchronization with N8 and masks slot S10. N6 and N7 may not be able to hear their synchronization reference N5.

Thus in general, higher level slaves can mask broadcast channels and cause cross talk.

Figure 4:
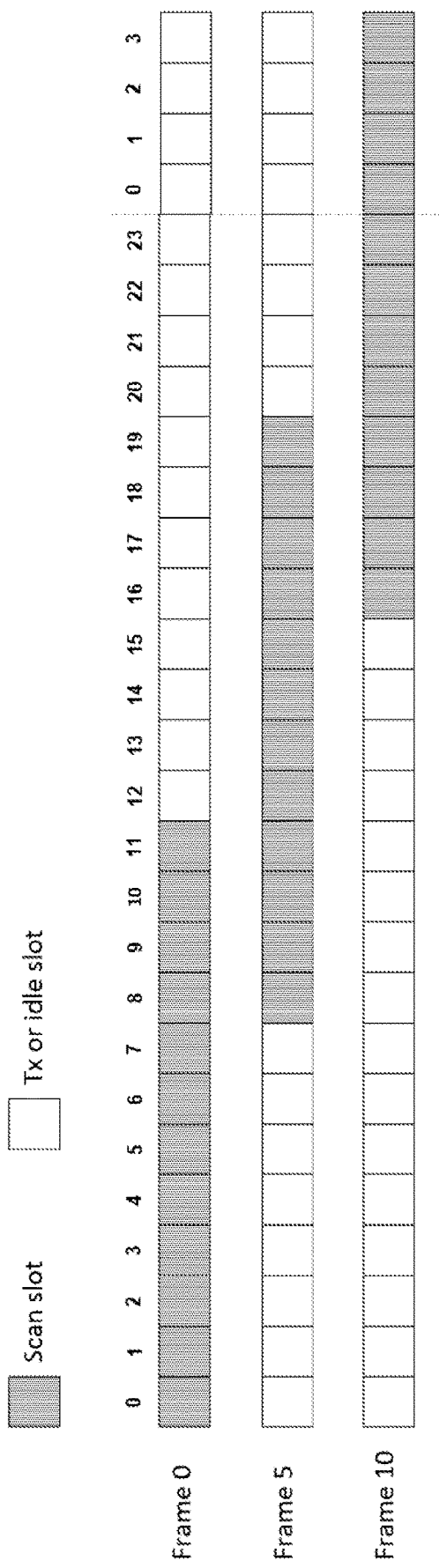
FIG. 4 illustrates an example of a possible scanning pattern for the wireless RF devices.

FIG. 4 illustrates an example of the background scanning preferably performed by a wireless RF device. The grey slots indicate scanning, whereas the white slots indicate idling or transmission of audio data packets. RSSI scanning may be scheduled such that unsynchronized interference and subgroups can be detected.

The following features are preferred either alone or two or more features in combination:

Wireless TDMA/FDMA frame structure with multiple timeslots and multiple frequencies, especially DECT.

There is no pre-defined master or slave role for the wireless RF device, it can dynamically take either roles.

Negotiation of network timing master role, thus a network of wireless RF devices is self-organizing. There is one timing master devices in network of devices within range of each other.

All devices are scanning all frequencies in the timeslots that are not used for transmission or receiving.

Frame timing tracking (synchronization) is based on receive-information

Dualslot diversity for improved reception probability (improved audio quality). The same application data is transmitted on two different timeslots and potentially on two different RF frequencies (redundant transmission). The receiving devices will normally listen to both transmission for redundancy.

One of the two dualslot receptions is occasionally replaced by a scanning operation on other frequencies. Due to the redundancy the received application data (audio). Hence the audio is not affected.

The transmit timeslots are allocated so as to minimize collision with transmission from other wireless RF devices. The transmit timeslot allocations is based on RSSI scan information and on usage information distributed from other devices.

All wireless RF devices are transmitting audio data packets in a connection-less manner. Other devices, master or slaves, which are in radio coverage range may receive the application audio data packets.

Each wireless audio device is able to receive from multiple other devices in the network. The receiver end is selecting the audio (or media) source. Multiple audio sources may be routed to the user (conference).

A network may be split into smaller groups. In each group a timing master is appointed. Groups may rejoin in to a larger network and only one timing master role will continue. When subgroups of devices are rejoining the TDMA frame timing will be aligned, so communication can continue in the large network.

Other media data in addition to audio can be implemented considered in the RF communication. Duplex communications are typically used.

Dynamic channel allocation (dynamic selection of timeslot and RF frequency with least interference). No frequency planning is required, and frequency reused is possible for devices out of range with none-overlapping coverage area.

Slave devices may be synchronized in a hierarchical order to other slave devices. A master device is providing timing synchronization on the top of such hierarchy. Management information may be relayed from master to slave devices, and from slave to other slave devices. Among more, the management information can be used to avoid unstable synchronization loops, and to relay information about timeslot usage, in order to minimize interference.

The application and audio QoS is provided by monitoring transmission quality. Bearer handover by selection of timeslot and frequency with least interference level is preferably used during operation.

Some wireless devices may (temporally) operate in listen-only mode (push-to-talk applications). This allows more devices to be used than the number of available TDMA timeslots.

Encryption of the communication can be implemented by distribution of an encryption key between master and slave devices and between slave devices.

Background frequency scanning of all TDMA timeslots for detection of other devices within wireless range. Occasionally the timeslot for transmission and reception are replace by frequency scanning operation. The scanning may even detect other devices that are not frame and timeslot aligned. The background frequency scanning serves multiple purpose:
(a) Detecting timeslot and frequency positions with least interference.
(b) Detecting the timeslot and frequency position of the master synchronization signal.
(c) Discover communication from other devices in a network group.
(d) Discover the presence of other network subgroups for potential rejoining.

Slave devices may communicate directly, even for short time without the existence of a master device.

High quality and wideband audio for duplex intercom is possible.

To sum up, the invention provides a wireless RF communication method and protocol for wireless RF communication of duplex audio in a flexible and self organizing network, especially audio data packets may be communicated according to a DECT protocol. Each wireless RF device is arranged to operate as a synchronization master or a synchronization slave, and where a negotiation algorithm is used to negotiate with other wireless RF devices present within wireless range to determine roles of master and slave(s). This allow wireless RF devices to leave or join groups of wireless RF devices within wireless range of each other, and still the synchronization master role is negotiated, and only one synchronization master is selected, whereas the remaining wireless RF devices will operate as synchronization slaves. Each wireless RF device performs a scanning of supported RF frequencies or channels to detect other wireless RF devices within wireless range.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for wireless RF communication of a digital audio signal in audio data packets, wherein the wireless RF communication comprises:
providing a plurality of wireless RF devices each being configured to operate as a synchronization master or a synchronization slave in accordance with a negotiation protocol, and each being configured to transmit and to receive audio data packets represented in frames each containing a plurality of time slots in a wireless RF signal at multiple supported RF frequencies or channels, wherein the wireless RF communication is performed according to a Digital Enhanced Cordless Telecommunication protocol;

scanning, by the plurality of wireless RF devices, all of the multiple supported RF frequencies or channels;

detecting, as a result of said scanning by the plurality of wireless RF devices, other wireless RF devices present within wireless range;

receiving audio data packets by a wireless RF device operating as a synchronization slave directly from another wireless RF device operating as a synchronization slave;

negotiating, according to the negotiation protocol, between the plurality of wireless RF devices present within wireless range to determine which one of the plurality of wireless RF devices to operate as a synchronization master, wherein the remaining wireless RF devices present within wireless range then determine to operate as synchronization slaves;

negotiating, according to the negotiation protocol, between the plurality of wireless RF devices present within wireless range, in case the wireless RF device operating as a synchronization master comes out of wireless range, so as to determine which one of the remaining wireless RF devices within wireless range to operate as a synchronization master;

negotiating, according to the negotiation protocol, between the plurality of wireless RF devices present within wireless range according to the negotiation protocol, in case two of the wireless RF devices operate as synchronization masters, so as to determine which one of said two wireless RF devices to operate as a synchronization master; and determining, by all of the wireless RF devices of the plurality of wireless RF devices, an interference level or a packet error rate on a plurality of supported RF frequencies and time slots, and to select on which RF frequency and in which time slot to transmit audio data packets accordingly.

2. The method according to claim 1, comprising providing a duplex audio communication between first and second wireless RF devices of the plurality of wireless RF devices.

3. The method according to claim 2, wherein audio data packets are transmitted from the first wireless RF device to the second wireless RF device is performed at a first supported RF frequency, and wherein audio data packets transmitted from the second wireless RF device to the first wireless RF device is performed at a second supported RF frequency being different from the first supported RF frequency.

4. The method according to claim 1, wherein said determining of the interference level comprises measuring a Received Signal Strength Indicator (RSSI) level.

5. A wireless RF device comprising at least one RF transmitter and RF receiver circuit connected to at least one RF antenna, the wireless RF device being arranged to operate according to the method according to claim 1.

6. The wireless RF device according to claim 5, wherein the device is one of: a wireless headset, a wireless microphone, a wireless loudspeaker, a wireless intercom system, a video system, and a Virtual Reality device.

7. The wireless RF device according to claim 5, being a wireless intercom system at least partly built into a helmet suitable for being worn by a person.

8. A system comprising a plurality of wireless RF devices according to claim 5.

* * * * *